UNITED STATES PATENT OFFICE.

CLAUDE A. O. ROSELL, OF NEW YORK, N. Y.

ANTISEPTIC COMPOSITION.

SPECIFICATION forming part of Letters Patent No. 622,713, dated April 11, 1899.

Application filed January 28, 1899. Serial No. 703,730. (No specimens.)

*To all whom it may concern:*

Be it known that I, CLAUDE A. O. ROSELL, of New York city, in the county and State of New York, have invented a new and useful Improvement in Antiseptic Compositions, which improvement is fully set forth in the following specification.

This invention relates to a composition containing extract of witch-hazel in which the use of alcohol as a preserving agent is dispensed with, as will now be fully explained.

Extract of witch-hazel as found in commerce is made by taking the fine twigs, branches, or bark from the witch-hazel bush, cutting up the material fine with a hay-cutter, adding water, and distilling. The distillate thus obtained, and which is called "crude" extract, will only keep for a few days before acetic-acid fermentation sets in. In order to preserve it, alcohol has to be added, twelve per cent. of alcohol in the mixture being sufficient for the purpose, and in this form all the extract of witch-hazel now on the market is found. In this composition the cost of the alcohol constitutes more than four-fifths of the total cost, and the desirability of dispensing with this expensive constituent is apparent.

Attempts have been made to use salicylic acid as a preserving agent. These attempts have been unsuccessful because the salicylic acid causes a discoloration of the liquid and does not properly preserve the same. Besides, the salicylic acid leaves on evaporation a solid residue, which is undesirable. The result is that witch-hazel extract preserved with salicylic acid has entirely disappeared from the market, and the alcoholic extract is the only form in which it is now found.

I have discovered that if to freshly-prepared witch-hazel distillate (the so-called "crude" extract) a small portion of formaldehyde be added the extract will be perfectly preserved without any deterioration of the product in other respects. The amount of formaldehyde needed is very small, about one-tenth of one per cent. of the commercial forty-per-cent. solution being sufficient for the purpose.

If desirable, a small quantity of alcohol, about four or five per cent., may be added to the witch-hazel extract for the sake of the alcoholic odor imparted thereto, but this is not necessary and may be done by the user or the retailer optionally.

The cost of the formaldehyde is less than one-thirtieth of that of the alcohol, so that the cost of this witch-hazel extract is less than one-fourth of the cost of the ordinary alcoholic extract and is at the same time of superior quality, as it is less diluted.

An important advantage of the new composition herein described is that the characteristic odor of witch-hazel is not in the least obscured or altered by the formaldehyde. Neither does the introduction of formaldehyde interfere with the medicinal virtues of the witch-hazel or with its external or internal use.

What I claim is—

An antiseptic composition containing extract of witch-hazel and formaldehyde.

In testimony whereof I have signed this specification in the presence of two subscribing witnesses.

CLAUDE A. O. ROSELL.

Witnesses:
 PHILIP MAURO,
 ELISHA K. CAMP.